(12) United States Patent
Büthker et al.

(10) Patent No.: US 9,974,132 B2
(45) Date of Patent: May 15, 2018

(54) CIRCUITS, CONTROLLERS AND METHODS FOR CONTROLLING LED STRINGS OR CIRCUITS

(71) Applicant: NXP B.V., Eindhoven (NL)

(72) Inventors: Henricus Cornelis Johannes Büthker, Mierlo (NL); Arnoud Pieter van der Wel, Vught (NL)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/260,612

(22) Filed: Sep. 9, 2016

(65) Prior Publication Data
US 2017/0086266 A1 Mar. 23, 2017

(30) Foreign Application Priority Data
Sep. 17, 2015 (EP) ..................................... 15185753

(51) Int. Cl.
*H05B 33/08* (2006.01)
*H05B 37/02* (2006.01)

(52) U.S. Cl.
CPC ......... *H05B 33/083* (2013.01); *H05B 33/089* (2013.01); *H05B 33/0815* (2013.01); *H05B 33/0842* (2013.01); *H05B 37/0281* (2013.01)

(58) Field of Classification Search
CPC ................ H05B 33/083; H05B 33/089; H05B 37/0281; H05B 33/0815; H05B 33/0842; H05B 33/0803; H05B 33/0812; H05B 33/0818; H05B 33/0827; H05B 33/0848; H05B 33/086; H05B 33/0866; H05B 33/0884; G09G 2310/024;
(Continued)

(56) References Cited

U.S. PATENT DOCUMENTS 7,911,151 B2 3/2011 Xu
8,004,211 B2 8/2011 van Erp
(Continued)

FOREIGN PATENT DOCUMENTS

WO WO-2010/027254 A1 3/2010

OTHER PUBLICATIONS

Extended European Search Report for Patent Appln. No. 15185753.9 (dated Jun. 13, 2016).
(Continued)

*Primary Examiner* — Alexander H Taningco
*Assistant Examiner* — Renan Luque
(74) *Attorney, Agent, or Firm* — Charlene R. Jacobsen

(57) ABSTRACT

Disclosed is a controller for controlling a string of N LEDs connected in series and each having a current bypass switch in parallel therewith and configured to be supplied from a current source connected in series with the string of LEDs and being supplied by a supply voltage, the controller comprising: a respective bypass switch controller for each bypass switch and configured to control the respective bypass switch such that the respective LED has an on-period and an off-period, according to a common duty cycle; a phase control unit configured to set a respective timing of each of the bypass switches such that the fraction of LEDs not bypassed corresponds to the duty cycle; and a duty cycle adjustor configured to adjust the duty cycle, in dependence on the supply voltage. Associated methods and circuits are also disclosed.

12 Claims, 8 Drawing Sheets

(58) Field of Classification Search
CPC ....... G09G 2320/064; G09G 2330/025; G09G 2330/06; G09G 3/342; Y02B 20/341
USPC ........ 315/294–297, 306, 312, 185 R, 209 R, 315/291, 247, 299, 188, 200 R, 201, 202, 315/205, 207, 119, 122, 307–308
See application file for complete search history.

(56) References Cited

U.S. PATENT DOCUMENTS

| | | | |
|---|---|---|---|
| 8,159,454 B2 | 4/2012 | Radermacher | |
| 8,400,075 B2 | 3/2013 | Guo | |
| 8,487,554 B2 | 7/2013 | Sauerlaender | |
| 8,773,042 B2 | 7/2014 | van Erp | |
| 8,890,432 B2 | 11/2014 | Jeong | |
| 8,890,442 B2 | 11/2014 | Radermacher | |
| 8,917,027 B2 | 12/2014 | Radermacher | |
| 9,055,639 B2* | 6/2015 | Chu | H05B 33/0824 |
| 9,101,019 B2* | 8/2015 | Jong | H05B 33/0818 |
| 9,313,839 B2* | 4/2016 | Viviani | H05B 33/0812 |
| 9,769,898 B1* | 9/2017 | Buthker | H05B 33/0845 |
| 2005/0243022 A1* | 11/2005 | Negru | H05B 33/0815 345/46 |
| 2007/0029946 A1* | 2/2007 | Yu | H05B 33/0818 315/291 |
| 2007/0257623 A1* | 11/2007 | Johnson | H05B 33/0818 315/193 |
| 2008/0202312 A1 | 8/2008 | Zane et al. | |
| 2010/0109570 A1 | 5/2010 | Weaver | |
| 2011/0227489 A1* | 9/2011 | Huynh | H05B 33/083 315/185 R |
| 2012/0223649 A1* | 9/2012 | Saes | H05B 33/0818 315/186 |

OTHER PUBLICATIONS

Opto Semiconductors; "LED Fundamentals—Driving LEDs-Resistors and Linear Drivers"; 23 pages (Aug. 19, 2011).

* cited by examiner

US 9,974,132 B2

CIRCUITS, CONTROLLERS AND METHODS FOR CONTROLLING LED STRINGS OR CIRCUITS

CROSS-REFERENCE TO RELATED APPLICATIONS

This application claims the priority under 35 U.S.C. § 119 of European patent application no. 15185753.9, filed Sep. 17, 2015 the contents of which are incorporated by reference herein.

FIELD

The present disclosure relates to controllers and circuits for controlling LED strings, to LEDs circuits, and to methods of controlling LEDs circuits.

BACKGROUND

For applications which require more than one LED, the LEDs are commonly connected in series as a so-called "LED string". The current through the LED string is controlled by a linear current source or by a switching regulator.

Switching regulators, such as DC-DC converters, require an inductor, and typically two capacitors. Each of these may be bulky, and contribute to the cost of the regulator. Conversely, linear current sources are generally compact and relatively inexpensive; however linear current sources generally can only handle a large input voltage range at the expense of low efficiency and large dissipation. This may prohibit their use unless the supply voltage range is limited.

SUMMARY

According to a first aspect of the present disclosure, there is provided a controller for controlling a string of N LEDs connected in series and each having a current bypass switch in parallel therewith and configured to be supplied from a current source connected in series with the string of LEDs and being supplied by a supply voltage, the controller comprising: a respective bypass switch controller for each bypass switch and configured to control the respective bypass switch such that the respective LED has an on-period and an off-period, according to a common duty cycle; a phase control unit configured to seta respective timing of each of the bypass switches such that the fraction of LEDs not bypassed corresponds to the duty cycle; and a duty cycle adjustor configured to adjust the duty cycle, in dependence on the supply voltage. Providing a duty cycle adjustor as part of the controller may allow for relatively simply design, with relatively few components, when compared with a controller which does not provide a duty cycle adjustor. Adjusting the duty cycle may then require separate components. Alternatively, if the LED circuit does not include any means to adjust the duty cycle, the LEDs might be utilised inefficiently, or operation of the LED circuit might be constrained unnecessarily: for instance it may not be possible to increase the LED duty cycle in order to reduce the operating current whilst maintaining a constant luminous output or average current, if a duty cycle adjustor is not provided.

In one or more embodiments, the duty cycle adjustor is configured to provide a common duty cycle reference signal indicative of the duty cycle to each bypass switch controller.

In one or more embodiments, the controller may be operable according to a clock signal, wherein duty cycle adjustor is configured to adjust the duty cycle reference signal each clock cycle.

In one or more embodiments, the duty cycle adjustor comprises a comparator configured to compare a voltage across the current source with a headroom voltage, and wherein the duty cycle adjustor is configured to: (a) periodically increase the duty cycle reference signal, (b) compare the voltage across the current source with the headroom voltage, and (b) decrease the duty cycle reference signal in response to the voltage across the current source being less than the headroom voltage.

In one or more embodiments, the phase control unit is configured to provide a sawtooth signal to each respective bypass switch controller, each sawtooth having N steps and being incremented by one step each clock cycle, the sawtooth signals being equally distributed in phase.

In one or more embodiments, the duty cycle adjustor comprises:
a comparator configured to determine whether the supply voltage is sufficient to drive a fraction of the string of LEDs corresponding to the duty cycle;
a duty cycle incrementor configured to increment the duty cycle reference signal by a fraction 1/M of a sawtooth step, where M is an integer, in response to the supply voltage being sufficient to drive the fraction of the string of LEDs corresponding to the duty cycle;
and a duty cycle decrementer configured to decrement the duty cycle reference signal by a fraction (M−1)/M of a sawtooth step in response to the supply voltage not being sufficient to drive the fraction of the string of LEDs corresponding to the duty cycle.

In one or more embodiments, M is equal to 2. In such embodiments, in steady state with a constant supply voltage, the duty cycle reference signal increases by one half of a sawtooth step on alternate clock cycles, and decreases by one half of sawtooth step on the other alternate clock cycles. In other embodiments, M is equal to an integer larger than 2. For instance, in embodiments in which M is equal to 3, in steady state with a constant supply voltage, the duty cycle reference signal may increase by one third of a sawtooth step for each of two consecutive clock cycles, and then decrease by two-thirds of a sawtooth step on the subsequent, third, clock cycle.

In one or more embodiments, each bypass switch controller comprises: a local comparator unit; and a flip-flop unit, wherein the flip-flop unit is configured to be reset to open the respective bypass switch at the start of the sawtooth, and the local comparator unit is configured to compare a value of the sawtooth with the duty cycle reference signal, and set the flip-flop unit to close the respective bypass switch in response to the sawtooth exceeding the duty cycle reference signal.

In one or more embodiments, the controller is a digital controller and comprises a processor device, a storage device comprising a plurality of registers and a machine readable storage medium.

In one or more embodiments the digital controller is configured to represent the duty cycle and the respective saw-tooth values as values in respective registers, and the output from each flip-flop unit as a flag.

According to another aspect of the present disclosure, there is provided a circuit comprising a controller as described above, the current source, and the bypass switches, and further comprising a driver for each of the LEDs.

According to another aspect of the present disclosure, there is provided an LED circuit comprising a controller as described above, the current source, the string of N LEDs connected in series and the respective current bypass switches.

In one of more embodiments the current source is arranged in series with the string of N LEDs and configured to be connected to a high-side voltage supply. In other embodiments, the current source is configured to be connected to a low-side voltage supply.

According to another aspect of the present disclosure, there is provided a method of controlling a string of LEDs connected in series and each having a current bypass switch in parallel therewith and being configured to be supplied from a current source connected in series with the string of LEDs and being supplied by a supply voltage, the method comprising: periodically opening and closing each bypass switch thereby setting a duty cycle having an on-period and an off-period for the respective LED; and setting a respective timing of each of the bypass switches such that the fraction of LEDs not bypassed corresponds to the duty cycle.

In one of more embodiments, the method further comprises: providing a clock signal; providing a sawtooth signal for each respective bypass switch, each sawtooth having N steps and being incremented by one step each clock cycle, the sawtooth signals being equally distributed in phase; incrementing a duty cycle reference signal by a fraction 1/M of a sawtooth step; determining, by means of a comparator, whether the supply voltage is sufficient to drive a fraction of the string of LEDs corresponding to the duty cycle; and decrementing the duty cycle by a fraction (M−1)/M in response to the supply voltage not being sufficient to drive the fraction of the string of LEDs corresponding to the duty cycle.

There may be provided a computer program, which when run on a computer, causes the computer to configure any apparatus, including a circuit, controller, sensor, filter, or device disclosed herein to perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the present disclosure will be apparent from, and elucidated with reference to, the embodiments described hereinafter.

BRIEF DESCRIPTION OF DRAWINGS

Embodiments will be described, by way of example only, with reference to the drawings, in which.

Figure 1:
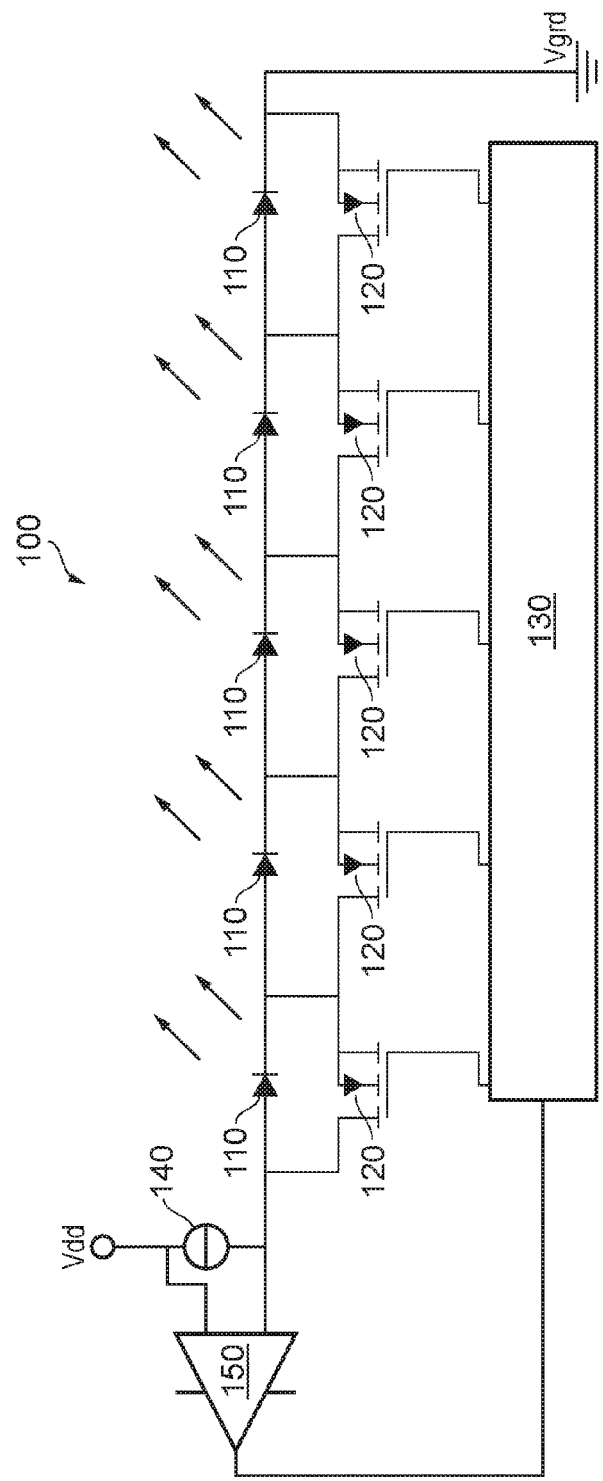
FIG. 1 illustrates an LED circuit.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

FIG. 1 illustrates, schematically, an LED circuit 100 comprising a string of N LEDs 110—in the non-limiting example shown N is equal to 5—connected in series and each having a respective current bypass switch 120. The circuit further comprises a controller 130 for controlling the bypass switches, and a current source 140. The circuit further includes a comparator 150, for comparing the voltage across the current source with a reference voltage (not shown). As shown in FIG. 1, the current source is arranged in series with the string of N LEDs and may be configured to be connected to a high-side voltage supply Vdd, the low-side of the LED string being connected to a ground Vgrd. It will be noted that only a single bypass is required for each of the LEDs.

Figure 2A:
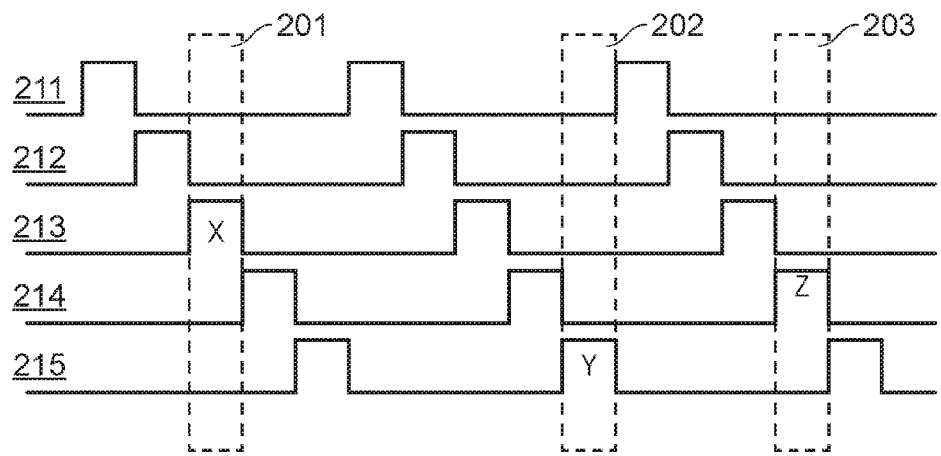
FIG. 2a shows control signals for a string of 5 LEDs, at a 20% duty cycle.
Figure 2B:
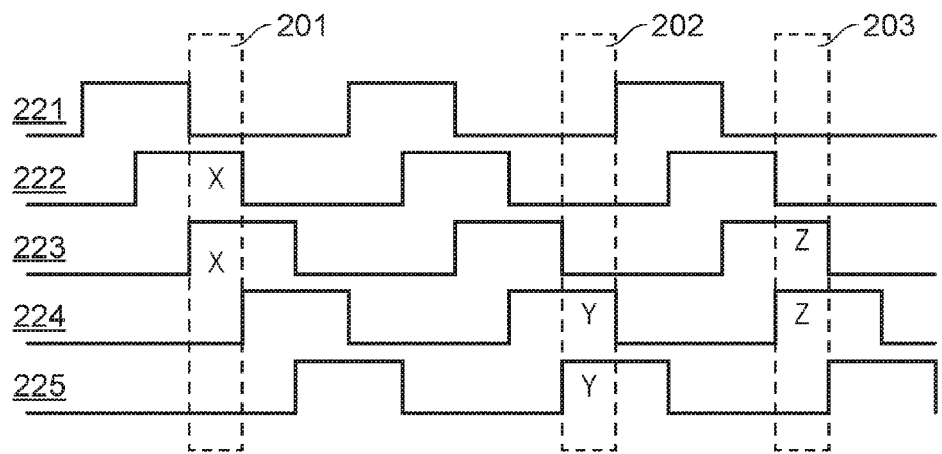
FIG. 2b shows control signals for a string of 5 LEDs, at a 40% duty cycle.
Figure 2C:
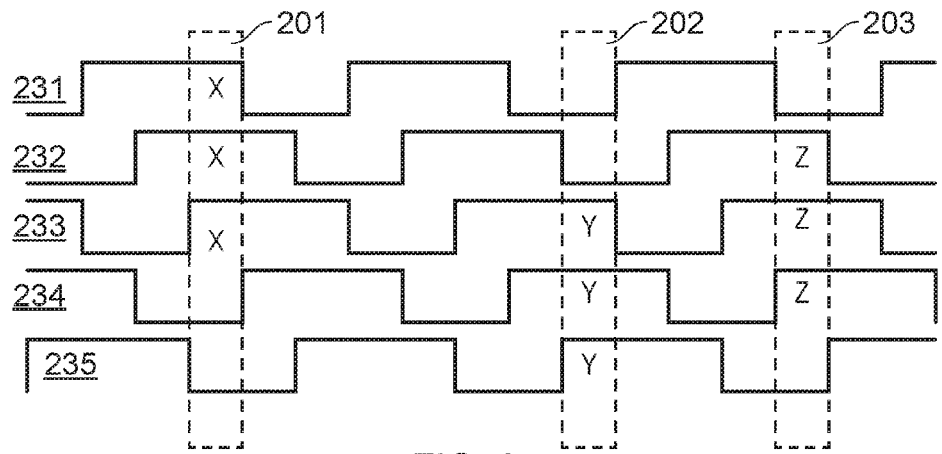
FIG. 2c shows control signals for a string of 5 LEDs, at a 60% duty cycle.

A method of controlling a string of LEDs, as shown in FIG. 1, will now be described: the method comprises periodically opening and closing each bypass switch thereby setting a duty cycle having an on-period and an off-period for the respective LED. This is illustrated in FIG. 2a, FIG. 2b and FIG. 2c, for three separate supply voltages. The figures show the duty-cycle for each of five LEDs in a 5-LED string. It will be appreciated that the drive signals for the bypass switch for the each respective LED is typically the inverse of the respective signal shown at FIG. 2: since a high signal for the bypass switch will typically turn that bypass switch to an "on" state, the LED corresponding to that bypass which is thereby bypassed is thus switched to "off" state. Of course, the bypass switches may be alternatively be configured as "normally on" switches such that a "high" control signal to the switch turns the switch off, and it reverts to an "on" state when the control signal is low; in such cases the state (high or low) of the control signal for a switch may directly correspond to the state (operating or non-operating) of the corresponding LED.

Turning first to FIG. 2a, this shows control signals 211, 212, 213, 214, and 215 for the five LEDs. As shown in the figure, the duty cycle for each LED is 20% or ⅕: that is to say, each of the LEDs is switched on for one fifth of the time, and switched off for ⅘ of time. The corresponding so-called "mark-space ratio" is 1:4, and the on-period for each LED is one fifth of the total cycle time. The total cycle time is the interval between the LEDs successively being turned on. Equivalently, the off-period for each LED is ⅘ of the total cycle time. As shown in FIG. 2a, the respective on-period of the LEDs are staggered, such that the on-period for each LED follows that of the previously turned on LED by one-fifth of the total cycle time.

Controlling the LEDs according to this scheme is thus appropriate when the supply voltage Vdd is sufficient to drive only one LED at any one given time. During any part of the total cycle time, one and only one LED is operating. This is shown schematically in FIG. 2a: for example, during an interval shown at 201 only the LED controlled by signal 213 is operating (shown at X) during an interval shown at 202 only the LED controlled by signal 215 is operating (shown at Y) and during an interval shown at 203, only the LED controlled by signal 214 is operating (shown at Z). It will be appreciated that the ordering of the respective on-periods may not be significant. For example the on-period of the second LED, corresponding to control signal 212, may follow rather than precede the on-period of the third LED corresponding to control signal 213, without altering the fact that at any time, one and only one LED is turned on or operating.

Turning now to FIG. 2b, this illustrates a control scheme appropriate when the supply voltage Vdd is sufficient to drive 2 LEDs at any given time. The LED control signals are shown at 221, 222, . . . 225. As shown in the figure, the duty cycle for each LED is 40% or ⅖: that is to say, each of the LEDs is switched on for one fifth of the time, and switched off for ⅘ of time. The corresponding so-called "mark-space ratio" is 2:3, and the on-period for each LED is two fifths of the total cycle time—that is to say the interval between the LEDs successively being turned on. Equivalently, the off-period for each LED is ⅗ of the total cycle time. As shown in FIG. 2b, the respective on-period of the LEDs are staggered, such that the on-period for each LED follows that of the previously turned on LED by one-fifth of the total cycle time.

During any part of the total cycle time for the scheme shown in FIG. 2b, two and only two LEDs are operating: during the interval 201 the LEDs controlled by signals 222 and 223 are operating (shown at X), during interval 202 the LEDs controlled by signals 224 and 225 are operating (shown at Y) and during interval 203, the LEDs controlled by signals 223 and 224 are operating (shown at Z). It will further be appreciated that, similarly, the ordering of the respective on-periods may not be significant. For example the on-period of the second LED, corresponding to control signal 222, may follow rather than precede the on-period of the third LED corresponding to control signal 223, without altering the fact that at any time, two and only two LEDs are turned on or operating.

Turning now to FIG. 2c, this illustrates a control scheme appropriate to when supply voltage BDG is sufficient to drive three LEDs at any given time; the LED control signals are shown at 231, 232 . . . 35, and the duty cycle for each LED is 60% or ⅗. Analogous to the situation shown in FIG. 2b, under this scheme, during the interval 201, the LEDs controlled by signals 231, 232 and 233 are operating (shown at X), during interval 202 the LEDs controlled by signals 233, 234 and 235 are operating (shown at Y) and during interval 203, the LEDs controlled by signals 232, 233 and 234 are operating (shown at Z).

The extension to the situation when the supply voltage is sufficient to drive four LEDs at any given time will be immediately apparent. The signals in that situation are the inverse of those shown in FIG. 2a: in particularly each LED will have a duty cycle of 80%, and the intervals for which the LEDs are not driven are staggered such that, at any time, four of the five LEDs are driven.

Since each LED is driven for the same fraction of time, that is to say, it has the same duty cycle, each LEDs in the string may be expected to age at the same rate. Furthermore, since at any moment the same number of LEDs are driven, the light intensity provided by the string of LEDs remains constant.

Although in FIGS. 2a, 2b, and 2c, there are five LEDs, that is to say, N=5, the disclosure extends to other integers N greater than or equal to 3. Typically but without limitation, N may be equal to 16 since this is a convenient number for automobile applications.

Figure 3:
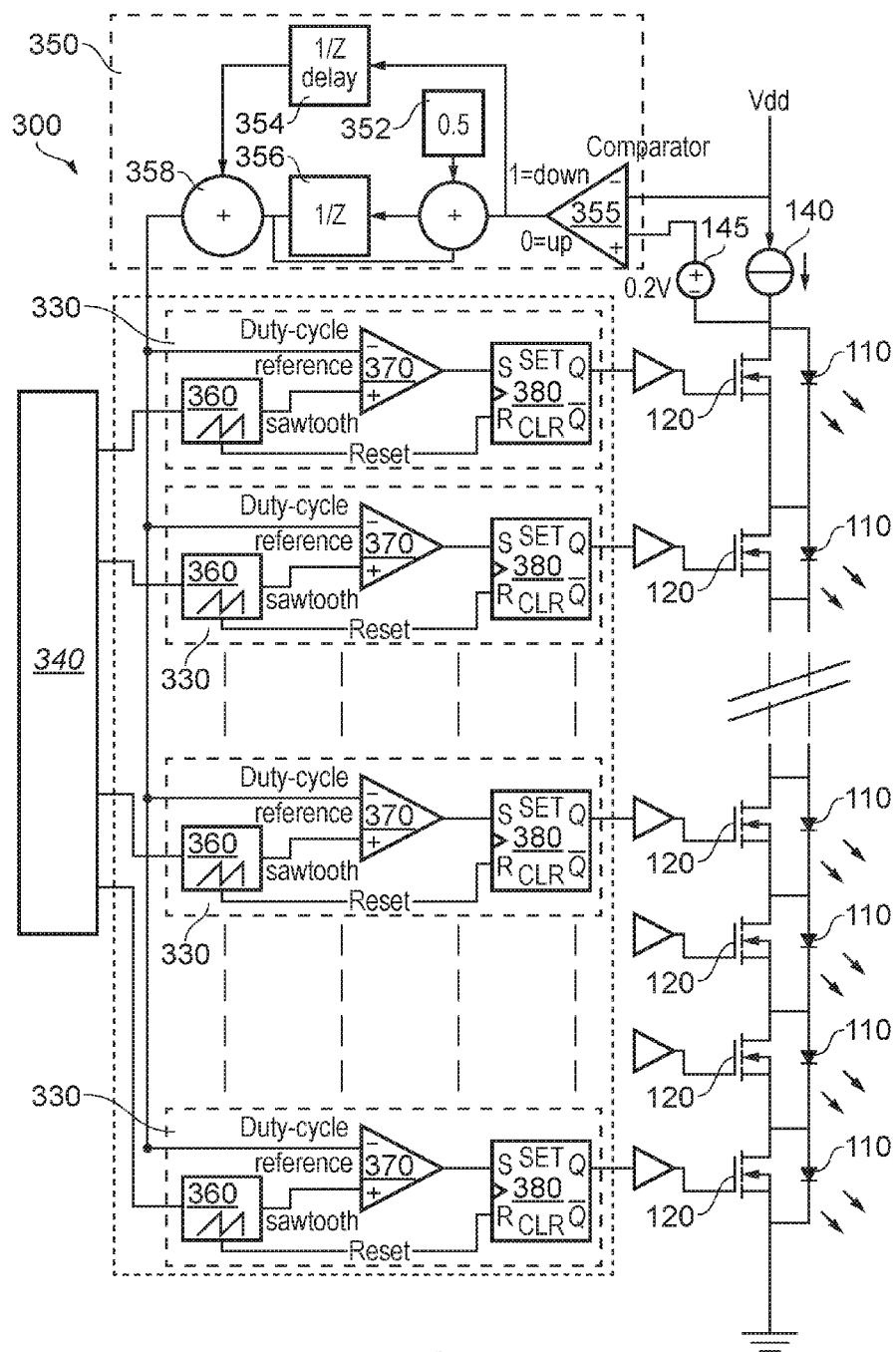
FIG. 3 illustrates an LED circuit in accordance with one or more embodiments disclosed herein.

FIG. 3, shows, schematically, a controller 300 for controlling a string of N LEDs 110 connected in series and each having a current bypass switch 120 in parallel therewith and configured to be supplied from a current source 140 connected in series with the string of LEDs and being supplied by a supply voltage Vdd. The current source 140 may be high-side or low-side of the LED string, but typically is provided high-side, since this configuration may allow for short circuit protection from any LED to ground. That is not generally possible with a low-side current source.

The controller comprises: a bypass switch controller 330 for each bypass switch and configured to control the respective bypass switch such that the respective LED has an on-period and an off-period, according to a common duty cycle. The duty of each of the LEDs is thus the same; however, the phase of the switching of the respective LED varies between the LEDs. The controller further comprises a phase control unit 340 configured to set a respective timing of each of the bypass switches such that the fraction of LEDs not bypassed corresponds to the duty cycle. The controller further comprises a duty cycle adjustor 350 configured to adjust the duty cycle, in dependence on the supply voltage. The phase control unit 340 provides a respective signal to each of the bypass switch controllers 330.

In embodiments in which the controller is digital, the respective signals may each be the value of a respective register. The phase control unit 340 may include a clock generator to provide a clock signal, or may be configured to accept a clock signal from a master clock which is not part of the phase control unit Each bypass switch con roller may, as shown in FIG. 3, include a sawtooth generator 360 for generating a sawtooth having N steps and being incremented by one step each clock cycle.

In other embodiments, a master sawtooth is generated within the phase control unit 340. Copies of the master sawtooth, having offset phases, are generated in the phase control unit 340, and passed, one to each of the bypass switch controllers 330. In other embodiments, the same master sawtooth is passed to each of the bypass switch controllers 330; and each bypass switch controller 330 adds a separate, respectively different, phase offset to the master sawtooth.

Each bypass switch controller may further include a local comparator unit 370 and a flip-flop unit 380. As shown by the "reset" signal, the flip-flop unit may be configured to be reset to open the respective bypass switch at the start of the sawtooth. The local comparator unit is configured to compare a value of the sawtooth with a duty cycle reference value ("duty cycle reference"), and set the flip-flop unit to close the respective bypass switch in response to the sawtooth exceeding the duty cycle reference value. During subsequent clock cycles, the sawtooth continues to increment until it reaches the maximum value N−1; on the next clock cycle it restarts at zero, and resets the flip-flop unit. It should be noted that the sawtooth increases in discrete steps, and as a result the duty cycle for the LED may only take on of the discrete values 0, 1/N, 2/N, 3/N . . . (N−1)/N. Conversely, the "duty cycle reference signal" may take a wider range of values, as will be described in more detail below. As a result of the operation of the comparator described above, the duty cycle for the LED associated with the bypass switch corresponds to a fraction (INT(duty cycle reference signal))/N.

In other embodiments, the controller may be at least part analogue, and the respective signal may be an analogue value, which changes from a first level to second level, and then restart at the first level. Typically the analogue value changes from 0 to a maximum level in steps. In such embodiments the reference value may be an analogue reference value, and the comparator compares the changing analogue value to the analogue reference value.

The phase control unit 340 provides that the phase of the respective signals are staggered. In the example of a digital controller, for an N-LED string, the phase difference between the signals is 2π/N. In other words, the signals are equally distributed, as will be described in more detail with respect to FIG. 8.

The duty cycle adjustor 350 is configured to adjust the duty cycle, in dependence on the supply voltage. That is to supply, the duty cycle may change in response to changes in the supply voltage. In particular, if the supply voltage falls such that it is no longer possible to sustain an adequate current through the LEDs which, at any given time, are not bypassed, the duty cycle adjustor decreases the duty cycle of each of the LEDs, typically by 1/N for a string of N LEDs. As a result, at any given time, there is one fewer LED which is not being bypassed, and the supply voltage would generally be sufficient to sustain an adequate current through the operating LEDs. Of course, if the supply voltage falls further, the duty cycle adjustor may be required to decrease the duty cycle by a further fraction 1/N. Conversely, if the supply voltage rises such that it would be possible to sustain an adequate current through a larger number of LEDs than are operating at any given time, the duty cycle adjustor increases the duty cycle of each of the LEDs, again typically by 1/N for a string of N LEDs.

The skilled person will appreciate that there are several ways to predict, or determine, whether the supply voltage is sufficient to sustain adequate current through the LEDs. For instance it would be possible to monitor the voltage across the current source, to and measure the "head room", for a specific length string, that is to say for a specific number of LEDs. If the voltage across an individual LED is also known, it then would be possible to determine whether or not the string length could be increased—that is to say the duty cycle increased—safely without having an under voltage. Alternatively, and without limitation, it is possible to monitor the current directly, and if the current is—even momentarily—lower than required, it may be concluded that the voltage is, at that moment, not sufficient to sustain adequate current through the LEDs. Here, it should be noted that in practice the headroom cannot go negative. When this situation approaches, the current through the LEDs drops to or near to zero, since the string voltage is insufficient to drive the complete string. Whereas a zero, or near zero, current through the string may be simple to detect, it may be undesired—since it would result in a temporary dimming or switch-off of the LEDs. An alternative is to choose a large headroom, for instance 4V. This would entail higher dissipation, and potentially more complex monitoring of the threshold. So a lower headroom may be preferred. Of course, it will be appreciated that the choice of appropriate headroom may depend on the voltage across each LED—so for red LEDs having a relatively low voltage drop over around 2.4V, a relatively low headroom may be chosen.

In one or more embodiments, the duty cycle adjustor comprises a comparator 355 configured to determine whether the supply voltage is sufficient to drive a fraction of the string of LEDs corresponding to the duty cycle, as shown in FIG. 3. Comparator 355 compares the voltage across the current source 140, with a headroom voltage 145, which may be as shown 0.2V. As will be discussed hereinbelow, other values may be chosen for the headroom voltage 145. In particular and without limitation the headroom voltage may depend on the type or colour of the LED, or the design of the current source 140. As shown in FIG. 3, the comparator may be a conventional comparator, which provides outputs of −1, or 0. This output is then AND combined with a 0.5 source (shown at 352), to give increment or decrement of, respectively, 0.5 and −0.5. This is delayed by a 1/z element (using z-transformation, this corresponds to a delay over one sample time), shown as 356, and combined at 358 with another 1/z element producing another delayed version of the input, as shown at 354 with a amplitude of for example 0.1. The 1/z elements in this digital time-discrete embodiment emulate a P-I controller. The P-factor (proportional factor) is provided by the 1/z element 354, and the I-factor (integrating) is provided by the 1/z element 356, in combination with the summation element 358. In other embodiments, an analogue controller may be used, including P-I control element or elements.

In other embodiments (not shown), a +1/−1 comparator may be used, with a ×0.5 scaling element, and directly connected to an integrator, to provide the same +0.5 or −0.5 change.

Thus, in embodiments as just described the duty cycle reference signal increases by 0.5 on alternate clock cycles, and decreases by 0.5 on the other alternate clock cycles.

Figure 5:
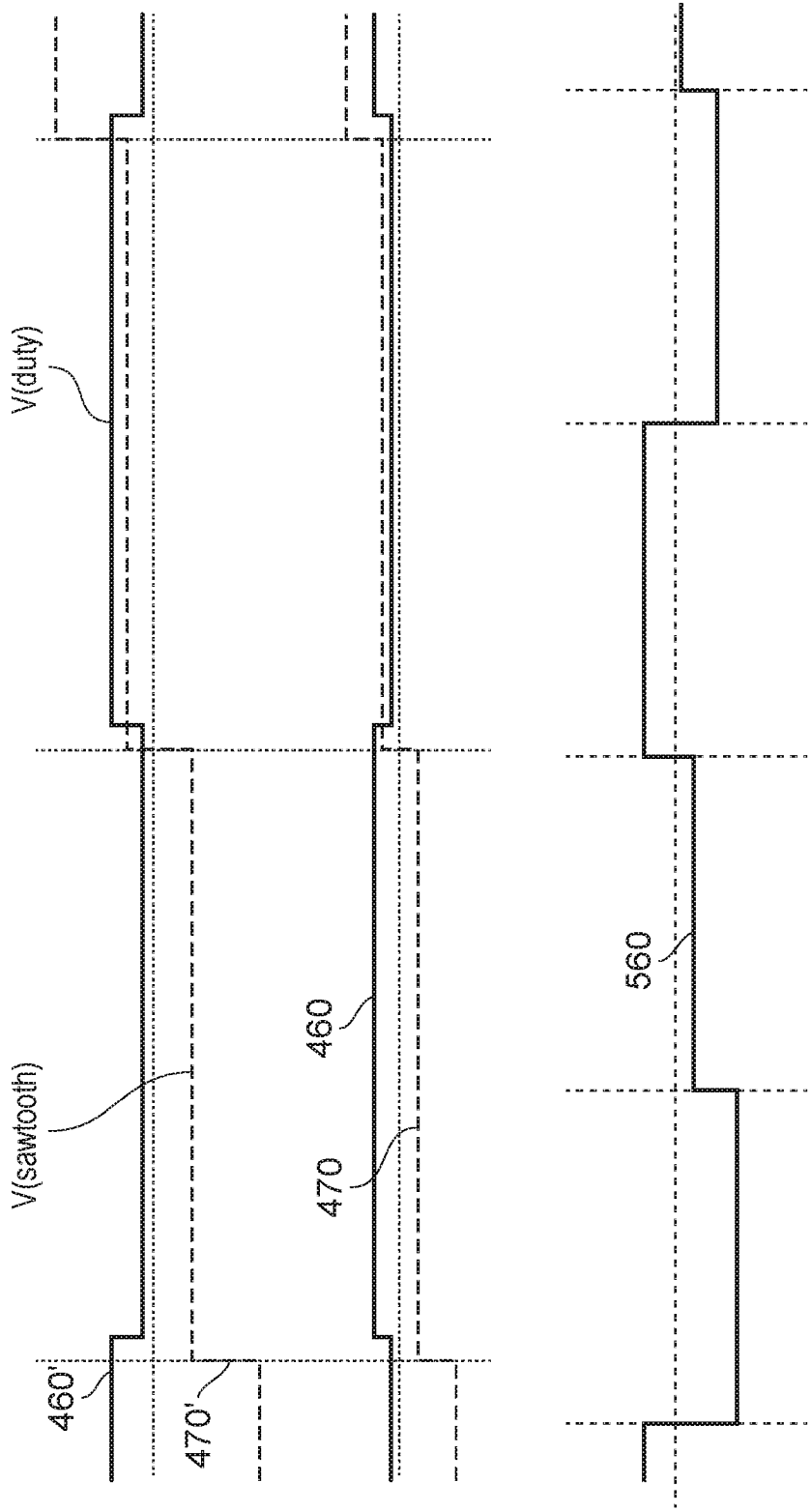
FIG. 5 shows examples of crossings of duty cycle reference signals and sawtooths, together with an example of a two-step duty cycle reference signal.

In other embodiments, duty cycle adjustor may be arranged to increase the duty cycle reference signal by one third, or one quarter (or another fraction in which the numerator is one), instead of by one half, provided that the supply voltage is sufficient to drive a fraction of the string of LEDs corresponding to the duty cycle. The corresponding decrease, for an increase of 1/P, in case it is determined that the supply voltage is insufficient, is then (1−1/P), that is to say (P−1)/P. For example, in an embodiment in which the duty cycle reference signal increases by one third, there may be two such increases of one-third, following by a decrease of two-thirds. This is illustrated in FIG. 5.

Figure 4:
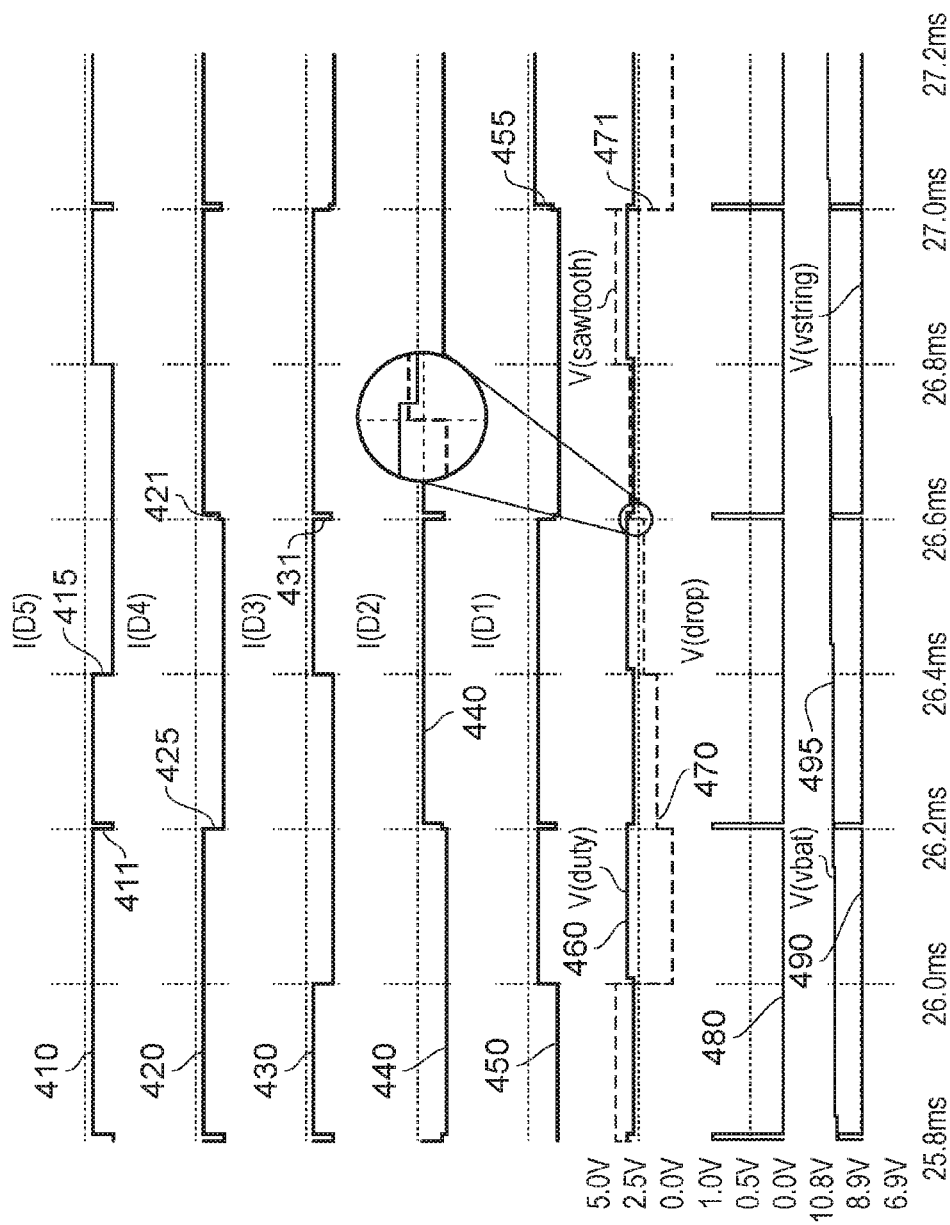
FIG. 4 illustrates one part of the operation of a circuit according to one or more embodiments.

One part of the operation of a circuit according to one or more embodiments is illustrated in FIG. 4. The figure shows plots against time for the current through a first, second, third, fourth and fifth LED at 410, 420, 430, 440 and 450 respectively, for one or more embodiments having 5 LEDs.

In the example shown, the clock period may be 200 μs. Each LED has an "on-period"—that is to say, the length of time for which the current 410, 420 . . . 450 is high, of approximately 600 μs; the off-period in this example may be 400 μs, resulting in a total cycle time of 1 ms, and a duty cycle of 60%. Furthermore, it can be seen that the on-periods of each of LEDs are staggered relative to each other by 200 μs. This corresponds to a single clock period. Moreover, it can be seen that periodically (that is to say, every 2 clock cycles, or every 400 μs during the on-period of an LED), there is a well-defined dip in the current from each LED, for instance as shown at 411, 421, and 431. This will be explained in more detail hereinbelow.

Also shown in FIG. 4 are two voltage signals 460 and 470. Signal 460 is the duty cycle reference signal. In the example shown, the duty cycle reference signal is represented by a discrete voltage, with 5V corresponding to 100% and zero volts corresponding to 0%. Signal 470 corresponds to a sawtooth. In the example shown, this sawtooth is used in the control of the fifth LED, and has 5 discrete steps, and ranges from 0V to 5V. As shown, the sawtooth is reset to 0 at edge 451, and increments by ⅕th (that is to say by 1V) on each clock cycle. Thus theoretically there are 6 levels (0, 1, 2, 5); however the sawtooth resets to 0 immediately on reaching "5" so in practice there are only 5 levels to consider.

The sawtooth 470 is used to control the duration of the on-period 450 of the fifth LED, as follows: ignoring for the moment the periodic increase and decrease (by 0.5V) of the duty cycle reference signal, the sawtooth is reset to 0 when the fifth LED is switched on (that is to say, the bypass switch for that LED is opened). The timing of the start of the on-period is controlled by the phase control unit 340, or in the bypass switch controller 330, as described hereinabove. The sawtooth increments by 1 V (that is to say 20%) each clock cycle, and is compared, by the comparator 370, with the value of the duty cycle reference signal. When the sawtooth signal exceeds the duty cycle reference signal, as shown at around 26.6 ms, the LED is switched off, by closing the bypass switch. The bypass switch remains closed until the sawtooth returns to zero, after reaching its maximum value; as the sawtooth returns to zero, at a subsequent falling edge such as 471, the LED is turned on, as described above. The value of the duty cycle signal thereby controls the fraction of the time that the LED is switched on.

The start of the respective sawtooth corresponding to each LED thus determines the start of the on-periods of the respective LEDs. This is controlled by a phase control unit, as already mentioned. Since the duty cycle signal is common to all the LEDs, the on-periods of the respective LEDs are equal. The phase of the on-periods is controlled by the phase control unit, which is configured to ensure that the phases are equally distributed throughout the complete cycle, by appropriately staggering the start of the respective sawtooth for each of the LEDs.

As mentioned above, the duty cycle reference signal has a periodic increase and decrease (by 0.5V). Since the fluctuation is less than 1V (i.e. the size of the sawtooth step), it does not, in steady state, have a significant effect on the above control mechanism, except on the exact timing of the closing of the bypass switch, as will be discussed in more detail below. In other embodiments, the duty cycle reference signal may have a different profile. For instance it may, as described above, include two positive steps of ⅓V, followed by a single decrease of ⅔V. An example of such a three level duty cycle reference signal having two positive steps followed by negative step is shown in FIG. 5 at 560. As will become apparent from the discussion below, the "dip" in the signals 410, 420 . . . 450, would then only occur every third clock cycle.

Embodiments according to the present disclosure are able to adjust the duty cycle, to accommodate a higher or lower supply voltage, as will now be described, with respect to FIGS. 4 to 8.

Firstly, the "steady state" situation, will be described:

As seen in FIG. 4, on alternate clock cycles on—that is to say every 200 μs—the duty cycle reference signal increments by 0.5 V. It should be noted that there is a small delay, which may be as shown approximately 10 μs—less than one clock cycle—between the increase in the sawtooth, and the change in duty cycle. As a result of the increase in the sawtooth for all LEDs, on each clock cycle, the sawtooth for a one of the LEDs reaches it's maximum (5V in this case and) is immediately reset to zero, as shown at 471, the corresponding bypass switch is opened, and that LED is switched on as shown as 455.

However, on some clock cycles, there may be a delay in switching off one of the LEDs: as has already been discussed, the bypass switch corresponding to a specific LED is opened when the corresponding sawtooth signal, for instance 470, exceeds the duty cycle reference signal 460. Because of the slight delay between the clock edge resulting in the level of the sawtooth increasing by one step, and the periodic increase or decrease in the duty cycle reference signal, on some clock cycles (specifically when the duty cycle reference signal decreases), the sawtooth does not cross the duty cycle reference signal on the clock edge, but only after a small delay, as can be seen from the insert in FIG. 4. The delay may typically be between 5 and 25 μs, or 10 μs. Since an additional LED has been turned on, and no corresponding LED has been turned off (yet), the string voltage increases, at least temporarily, as shown by signal 490 which is indicative of the voltage across the complete string.

If the "correct" number of LEDs—ie the maximum number sustainable by the supply voltage—are already operating at any one time, corresponding to a "correct" duty cycle, then increasing the number of LEDs by one has the result that the current source can no longer supply the requested current to keep all operational LEDs operating at the correct current, since this would require a higher voltage than is available. As a result, the current through the current source—and thus the LEDs—falls, as shown in the dip indicated at 421, and 431. The circuit determines that the supply voltage is insufficient to power all the operating LEDs, for example by sensing the dip in current or, as in the embodiment shown in FIG. 3, by the comparator 355.

The figure shows, at signal 480, a signal "voltage" corresponding to a "−1" output from the comparator 355 shown in FIG. 3. As described above, a high "voltage drop" signal 480 corresponding to a "−1" output from comparator 355, results in a reduction in the duty cycle reference signal 360. In this embodiment the reduction may be by 0.5V, although, as discussed above, it may alternatively be 0.667V, 0.75V, etc. for a sawtooth step size of 1V). In any case, it is the reduction in the duty cycle reference signal which results in the sawtooth exceeding the signal, for one of the LEDs, and that LED's bypass switch being closed.

FIG. 5 shows the duty cycle reference signal 460, and sawtooth 470, and, in addition shows the corresponding duty cycle reference signals 460' and sawtooth 470', which may occur in the converse situation when the sawtooth crosses the duty cycle reference signal on a clock cycle in which the duty cycle reference signal increases rather than decreases. As can clearly be seen, in this latter situation, the sawtooth crosses the duty cycle reference signal immediately on the clock edge. In this situation, there is no temporary increase in the number of the LEDs in the string.

Figure 6:
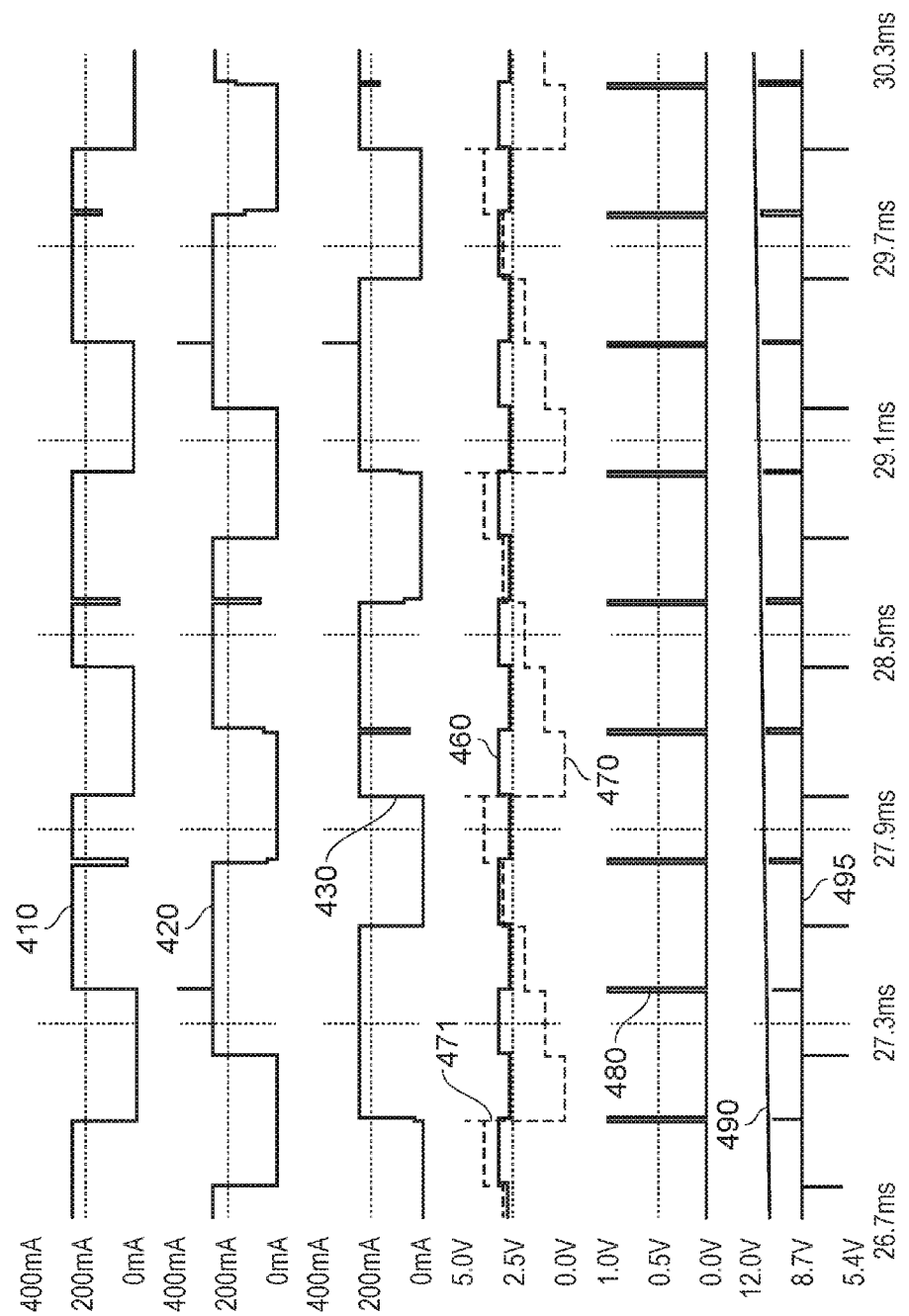
FIG. 6 shows some of waveforms of FIG. 4, but over a longer time period including several complete sawtooth cycles.

FIG. 6 shows some of the waveforms shown in FIG. 4, but over a longer time period including several complete sawtooth cycles. From this figure it is clear that the three LEDs 410, 420 and 430 have the same duty cycle, but are staggered in phase by one clock cycle.

Figure 7:
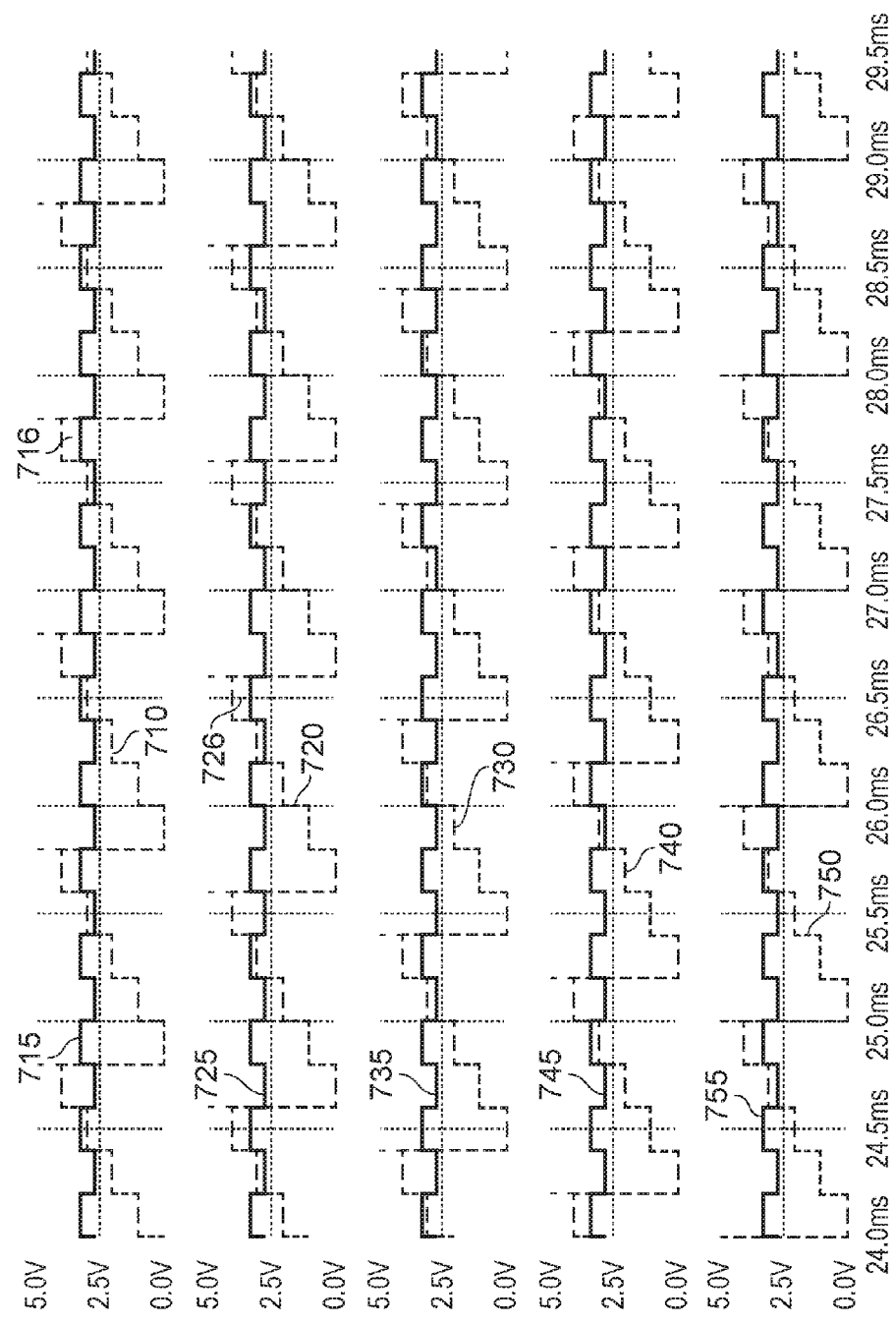
FIG. 7 shows the sawtooth and duty cycle waveforms for each LED string, according to one or more embodiments.

FIG. 7 shows waveforms according to one or more embodiments. Sawtooths 710, 720, 730, 740 and 750 are shown for different LEDs, with corresponding duty cycle reference signals shown at 715, 725, 735, 745 and 755. The duty cycles in this case are stable or "constant", in the sense that there is no change over a long time period. However as shown the duty cycle reference signals periodically increase once every alternate clock cycle and then decrease again on the subsequent cycle. The increase and decrease are each equal to one half the magnitude of the sawtooth step. The duty cycle reference signals are the same for each of the LEDs. As shown the sawtooth waveforms are staggered, that is to say, they are offset in time with respect to each other, with an offset of one clock cycle between adjacent LEDs. This allows for the periods when the respective LEDs are off (which corresponds to the areas 716, 726 etc.) to be evenly distributed over time, as shown in FIG. 2.

Figure 8:
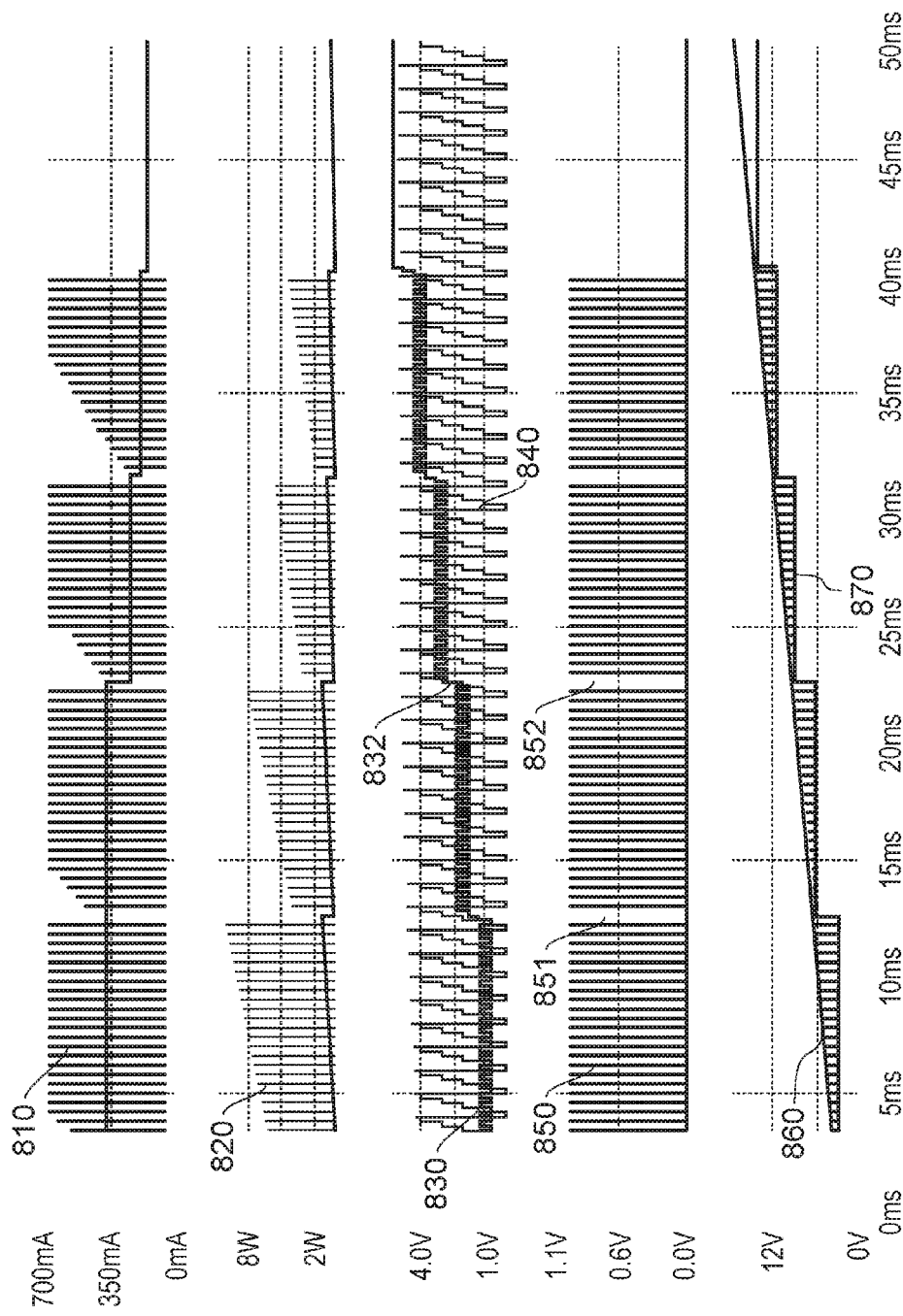
FIG. 8 shows operation of a circuit according to one or more embodiments, in circumstances of gradually increasing supply voltage.

FIG. 8 illustrates how a controller according to one or more embodiments adjusts the duty cycle of one of the LEDs, from 20% to 100% under conditions of a gradually increasing supply voltage, according to one or more embodiments. It will be understood that although the adjustment to the duty cycle of just one of the LEDs is discussed, the duty cycle of each of the LEDs is thereby adjusted, since all the LEDs have the same duty cycle. The skilled person will appreciate that such a condition would be generally considered to be artificial and not frequently encountered in a real-life application—although it could occur, for instance in an automobile-related application in which a dynamo is recharging a supply battery from a very low voltage.

Next will be considered, with reference to FIG. 4 and FIG. 8 in particular, a "non-steady state" situation, with particular reference to the non-limiting the case of an increasing supply voltage as show in FIG. 8.

FIG. 8 shows various waveforms, for a system according to one or more embodiments, in the case of a gradually increasing battery or supply voltage Vdd. The gradually increasing battery voltage is shown at 860. 810 represents the current through the LED string. 820 represents the power dissipated in the current source 140. 830 represents the duty cycle signal. 840 represents the sawtooth for one of the LEDs, 850 represents the "Vdrop" waveform corresponding to the output of comparator 355. And 870 represents the voltage across a string of LEDs.

As already discussed, during a first time period (for instance from 5 ms to approximately 12 ms, the duty cycle is 20% (or "1V", on a scale of 1 to 5V), such that at any moment, one and only one LED is on, and the duty cycle reference signal toggles between 0.75 and 1.25. The supply voltage is gradually increasing, but each time an additional LED is introduced into the string, increasing the effective string length by one (to two LEDs), the increased voltage across the string (shown by the vertical upwards spikes in the string voltage 870) results in a decrease of the headroom voltage (that is to say, the gap between the vertical spikes in the strings voltage 870, and the supply voltage 860), to fall below the allowed headroom voltage. In this embodiment, the allowed headroom voltage is 0.2V. When the headroom voltage falls beloe that allowed, the comparator indicates that the duty cycle reference signal is too large. As a result the duty cycle reference signal decreases, and is crossed by one of the sawtooth signal such that the corresponding bypass switch is closed to bypass the respective LED and reduce the string length by one. Thus, so far, the operation corresponds to the steady state situation However, as the supply voltage 860 continues to increase, a moment is reached (at around 12.5 ms on FIG. 8) at which the increase in string voltage resulting from the temporary increase in string length does not result in the headroom voltage falling below its minimum allowed level. As a result, the comparator does not produce a high "voltage drop signal". This can be seen in the figure as a missing spike at position 851 of the voltage drop signal 850. The comparator then does not the force the duty cycle reference signal downwards, on the next cycle. Instead of decreasing, the duty cycle reference signal increases by a step (0.5 in this case). Moreover, since at this time the sawtooths from all the LEDs also increase (by 1), there is no other LED for which the sawtooth crosses the duty cycle reference signal, and so none of the bypass switches are closed on this clock cycle. Furthermore, because of the difference in step size between the duty cycle reference signals and the sawtooth, during the next clock cycle, there is still no crossing of any of the sawtooths with the duty cycle reference signal an the duty cycle reference signal again increases by 0.5, and so in total the resulting increase in duty cycle reference signal is equal to 1. In other words, the duty cycle has increased by one unit (to 40%).

Since there is now little headroom between the string voltage and the supply voltage, the situation is now similar to that for the 20% duty cycle. In other words, each time the string length is temporarily increased by one (to three), the resulting increase in string voltage results in the "adequate headroom" condition being broken, and the duty cycle reference signal now alternates between 1.75 and 2.25. This situation continues until the supply voltage has increased sufficiently for the duty cycle to increase from 40% to 60%. When this occurs, a further voltage drop signal is skipped, as shown at 852, resulting in another negative step of the duty cycle reference signal being replaced by positive step, as shown at 832, and an increase in the number of LEDs in the string at any one time from 2 to 3.

It will be appreciated that, although the step size of the sawtooth has generally been referred to herein as "1" or "1V", other step sizes or representations may be used. The magnitude of the duty cycle reference signal is adapted accordingly. To illustrate this, consider the following non-limiting example, for an embodiment in which there is a digital implementation for a string of 16 LEDs, and an using 8-bit controller. Registers may conveniently be used which accept values between zero and 511 ($2^8-1$). The step size of the sawtooth may then conveniently be set to be 16 ($2^4$), resulting in 16 possible steps. For a 25% duty cycle corresponding to 4 LEDs being on at any one moment, the duty cycle reference signal may toggle between 64−4 and 64+4, that is to say between 60 and 68. If the supply voltage then increases to allow a duty cycle of 31.25% (ie 5 of the LEDs can be operating at any one time), the duty cycle reference signal may then toggle between 80−4 and 80+4, that is to say between 76 and 84.

As will be evident from the discussion above, embodiments may include a processor, along with a memory, various inputs for receiving signals indicative of voltages and/or currents, and outputs for controlling the bypass switches, and a set of instructions to enable the processor to operate a method as described for controlling an LED string. Thus, in some embodiments, one or more of the steps discussed may be provided by software, firmware, or hardware.

From reading the present disclosure, other variations and modifications will be apparent to the skilled person. Such variations and modifications may involve equivalent and other features which are already known in the art of LED controllers, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

LIST OF SYMBOLS

110 LED
120 current bypass switch
130 controller
140 current source
150 comparator
330 bypass switch controller
340 phase control unit
350 duty cycle modulator
354 P-factor 1/z element
355 comparator
356 I-factor 1/z element
358 summation element
360 sawtooth generator
370 local comparator
380 flip-flop unit
410 current through a first LED
420 current through a second LED
430 current through a third LED
440 current through a fourth LED
450 current through a fifth LED
460, 460' duty cycle reference signal
470, 470' sawtooth signal
480 voltage drop signal
490 string voltage
495 battery voltage
560 two step duty cycle reference signal
710, 720, 730, 740, 750 sawtooth signal
715, 725, 735, 745, 755 duty cycle reference signal
716, 726 LED bypass periods
820 power dissipated in current source
830 duty cycle reference signal
840 sawtooth signal
850 voltage drop signal
851 missing voltage drop peak

The invention claimed is:

1. A controller for controlling a string of N LEDs connected in series and each having a current bypass switch in parallel therewith and configured to be supplied from a current source connected in series with the string of LEDs and being supplied by a supply voltage, the controller comprising:

a respective bypass switch controller for each current bypass switch and configured to control the current bypass switch such that the respective LED has an on-period and an off-period, according to a common duty cycle;
a phase control unit configured to set a respective timing of each of the current bypass switches such that the fraction of LEDs not bypassed corresponds to the common duty cycle; and
a duty cycle adjustor configured to adjust the common duty cycle, in dependence on the supply voltage, and further configured to provide a duty cycle reference signal indicative of the common duty cycle to each respective bypass switch controller, wherein the duty cycle adjustor comprises a comparator configured to compare a voltage across the current source with a headroom voltage, and wherein the duty cycle adjustor is configured to: (a) periodically increase the duty cycle reference signal, (b) compare the voltage across the current source with the headroom voltage, and (c) decrease the duty cycle reference signal in response to the voltage across the current source being less than the headroom voltage.

2. A controller as claimed in claim 1, operable according to a clock signal, wherein the duty cycle adjustor is configured to adjust the duty cycle reference signal each clock cycle.

3. A controller as claimed in claim 1, operable according to a clock signal, wherein the phase control unit is configured to provide a sawtooth signal to each respective bypass switch controller, each sawtooth signal having N steps and being incremented by one step each clock cycle, the sawtooth signals being equally distributed in phase.

4. A controller as claimed in claim 3 wherein:
the comparator is configured to determine whether the supply voltage is sufficient to drive a fraction of the string of LEDs corresponding to the common duty cycle; and
the duty cycle adjustor further comprises:
a duty cycle incrementor configured to increment the duty cycle reference signal by a fraction 1/M of a sawtooth step, where M is an integer, in response to the supply voltage being sufficient to drive the fraction of the string of LEDs corresponding to the duty cycle; and
a duty cycle decrementer configured to decrement the duty cycle reference signal by a fraction (M−1)/M of the sawtooth step in response to the supply voltage not being sufficient to drive the fraction of the string of LEDs corresponding to the duty cycle.

5. A controller a claimed in claim 4, wherein M is equal to 2.

6. A controller as claimed in claim 3, wherein each respective bypass switch controller comprises:
a local comparator unit; and
a flip-flop unit, wherein the flip-flop unit is configured to be reset to open the respective bypass switch at the start of the sawtooth signal, and the local comparator unit is configured to compare a value of the sawtooth signal with the duty cycle reference signal, and set the flip-flop unit to close the respective bypass switch in response to the sawtooth signal exceeding the duty cycle reference signal.

7. A controller as claimed in claim 1, wherein the controller is a digital controller and comprises a processor device, a storage device comprising a plurality of registers and a machine readable storage medium.

8. A digital controller as claimed in claim 7 wherein:
the digital controller is configured to represent the common duty cycle and the respective sawtooth signals as values in respective ones of the plurality of registers, and an output from each flip-flop unit of each respective bypass controller unit as a flag.

9. A circuit comprising a controller as claimed in claim 1, the current source, and the current bypass switches, and further comprising a driver for each of the LEDs.

10. An LED circuit comprising a controller as claimed in claim 1, the current source, the string of N LEDs connected in series and the respective current bypass switches.

11. An LED circuit according to claim 10, wherein the current source is arranged in series with the string of N LEDs and configured to be connected to a high-side voltage supply.

12. A method of controlling a string of LEDs connected in series and each having a current bypass switch in parallel therewith and being configured to be supplied from a current source connected in series with the string of LEDs and being supplied by a supply voltage, the method comprising:

periodically opening and closing each current bypass switch thereby setting a duty cycle having an on-period and an off-period for the respective LED;

setting a respective timing of each of the current bypass switches such that the fraction of LEDs not bypassed corresponds to the duty cycle;

providing a clock signal;

providing a sawtooth signal for each respective current bypass switch, each sawtooth signal having N steps and being incremented by one step each clock cycle, the sawtooth signals being equally distributed in phase;

incrementing a duty cycle reference signal by a fraction 1/M of a sawtooth step;

determining, by means of a comparator, whether the supply voltage is sufficient to drive a fraction of the string of LEDs corresponding to the duty cycle; and decrementing the duty cycle by a fraction (M−1)/M in response to the supply voltage not being sufficient to drive the fraction of the string of LEDs corresponding to the duty cycle.

* * * * *